UNITED STATES PATENT OFFICE.

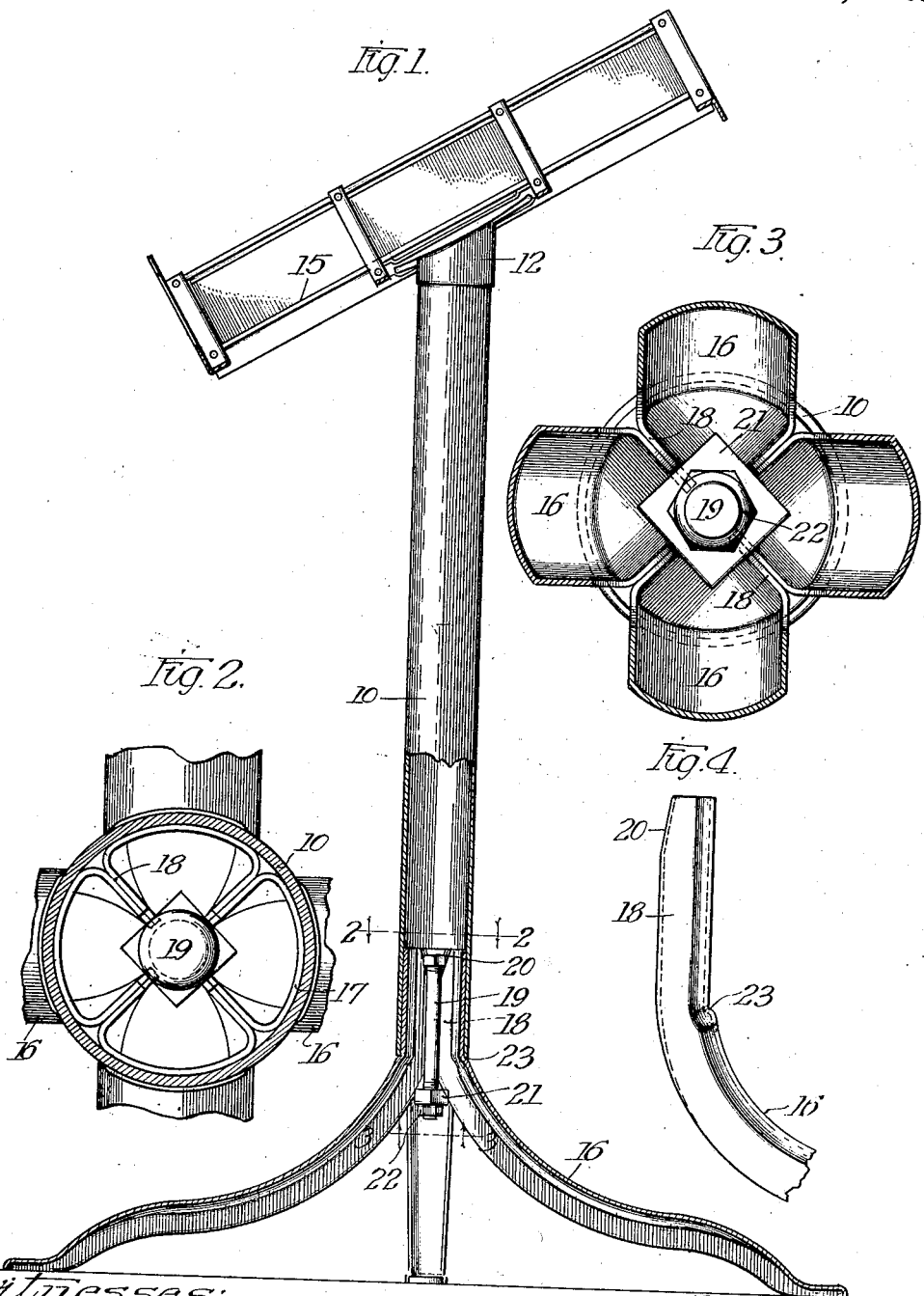

NELSON DE LONG, OF CHICAGO, ILLINOIS.

STAND.

1,335,726.

Specification of Letters Patent.

Patented Apr. 6, 1920.

Application filed September 25, 1915, Serial No. 52,565. Renewed August 15, 1919. Serial No. 317,787.

*To all whom it may concern:*

Be it known that I, NELSON DE LONG, a citizen of the United States of America, and a resident of the city of Chicago, county of Cook, and State of Illinois, have invented certain new and useful Improvements in Stands, of which the following is a specification.

My invention relates to stands and has for its object improvements in such devices.

In the accompanying drawings—

Figure 1 is an elevation of the stand, partly in section;

Fig. 2 is an enlarged section on line 2—2 of Fig. 1;

Fig. 3 is an enlarged section on line 3—3 of Fig. 1;

Fig. 4 is an enlarged detail of the upper end of one of the legs.

The standard 10 consists of a plain piece of tubing having a supporting cap 12 thereon. Mounted upon the cap is a rack 15.

The method of securing the various parts above mentioned is shown in my application No. 824,375, bearing date of March 13, 1914, and forms no part of the present invention.

The legs 16 may be castings but are preferably made of sheet metal bent to the form illustrated and are inserted in the lower end of the tube 10.

As shown in Fig. 2, the upper end of the legs 17 fit together as hollow sectors of a circle which corresponds to the inner surface of the tube 10. The abutting sides 18 of the sectors extend radially toward and close to a central bolt 19. The upper ends of these sides 18 are beveled as shown at 20 in Figs. 1, 2 and 4, and the head of the bolt 19 rests on these beveled faces so that when the bolt 19 is drawn downward the head acts to spread the top ends of the legs and thus clamp them to the interior face of the standard 10. A washer 21 rests against the inclined inner faces of the legs, and a nut 22 serves to draw the bolt 19 downward with any desired degree of force. Shoulders 23 formed on the outer faces of the legs serve to determine the distance which the legs are inserted in the standard, and also serve as a stop or support to carry the load placed on the rack 15. It will be obvious that by removing the nut 22 that the bolt 19 may be easily pushed inward and the legs will thereby be freed from the clamping action and can be very readily removed. There is an advantage in using four legs in that there are four inclined surfaces 20, and an ordinary bolt with a square head will rest on these faces. When the nut 22 is tightened the washer 21 bears against the inner faces of the legs below the standard 10 and a consequent spreading action follows. This keeps the lower end of the standard in contact with the shoulders 23 and prevents the standard from passing that point. Also when the nut 22 is tightened the bolt 19 is prevented from turning by reason of the square head on said bolt.

What I claim is

1. A tubular standard, legs having their upper ends in the form of sectors so constructed that when the legs are united the sectors form a cylinder fitting the interior of the standard, and a bolt serving to spread the sectors to force their exterior surfaces in contact with the interior of the standard.

2. A table and a tubular standard therefor, legs projecting into the lower end of the standard and provided with shoulders for limiting the amount of such projection, and a central bolt serving to spread the inwardly projecting ends of said legs into frictional contact with the inner wall of said standard.

3. In a stand, a standard, legs having their upper ends inserted in the standard, stops on the legs for limiting such insertion, beveled faces on the legs, and a bolt having its head in contact with the beveled faces, said bolt serving to maintain friction between the legs and the standard to prevent accidental removal of the legs.

4. In a stand, a tubular standard, legs inserted in the standard, stops on the legs to limit the insertion of the legs in the standard, beveled faces on the inner edge of the upper ends of the legs, a bolt having its head in contact with the beveled faces of the legs, and a nut for the bolt by which frictional contact is maintained between the beveled faces of the legs and the bolt and a consequent friction between the legs and the tubular standard.

Signed at Chicago, Illinois, this 23rd day of September, 1915.

NELSON DE LONG.